United States Patent
Groeger

(10) Patent No.: US 6,377,160 B1
(45) Date of Patent: Apr. 23, 2002

(54) ELECTRONIC ACCESSORY FOR A MOTOR VEHICLE, IN PARTICULAR FOR A CAR RADIO, COMPRISING A KEY CARD

(75) Inventor: Klaus-Erwin Groeger, Diekholzen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/230,905
(22) PCT Filed: Jul. 15, 1997
(86) PCT No.: PCT/DE97/01491
§ 371 Date: Sep. 9, 1999
§ 102(e) Date: Sep. 9, 1999
(87) PCT Pub. No.: WO98/05532
PCT Pub. Date: Feb. 12, 1998

(30) Foreign Application Priority Data

Aug. 5, 1996 (DE) .......................................... 196 31 591

(51) Int. Cl.[7] ................................................. G06F 7/04
(52) U.S. Cl. .................... 340/5.6; 340/5.7; 307/10.1; 307/10.2; 455/344; 455/345; 455/346
(58) Field of Search .................. 340/5.6, 5.7; 307/10.1, 307/10.2; 455/344, 345, 346

(56) References Cited

U.S. PATENT DOCUMENTS

| | | | |
|---|---|---|---|
| 4,494,114 A | * 1/1985 | Kaish | 340/825.31 |
| 4,604,708 A | 8/1986 | Gainer | 364/900 |
| 4,734,896 A | 3/1988 | Soma et al. | 340/568 |
| 4,754,838 A | * 7/1988 | Cody | 180/287 |
| 5,703,795 A | * 12/1997 | Mankovitz | 364/514 R |

FOREIGN PATENT DOCUMENTS

| | | |
|---|---|---|
| DE | 35 20 395 | 10/1986 |
| DE | 40 14 371 | 4/1991 |
| DE | 43 37 262 | 3/1995 |
| EP | 0 329 513 | 8/1989 |
| EP | 0 525 895 | 2/1993 |

* cited by examiner

*Primary Examiner*—Michael Horabik
*Assistant Examiner*—M Shimizu
(74) *Attorney, Agent, or Firm*—Kenyon & Kenyon

(57) ABSTRACT

In an electronic add-on device for an automobile, in particular, a car radio having a key card designed as a chip card, which is insertable in a slot to safeguard the device from theft, the device includes such a control circuit that the inserted chip card can also allow the device to be operated even after the chip card is removed from the slot, until the device is disconnected from the power supply.

3 Claims, 1 Drawing Sheet

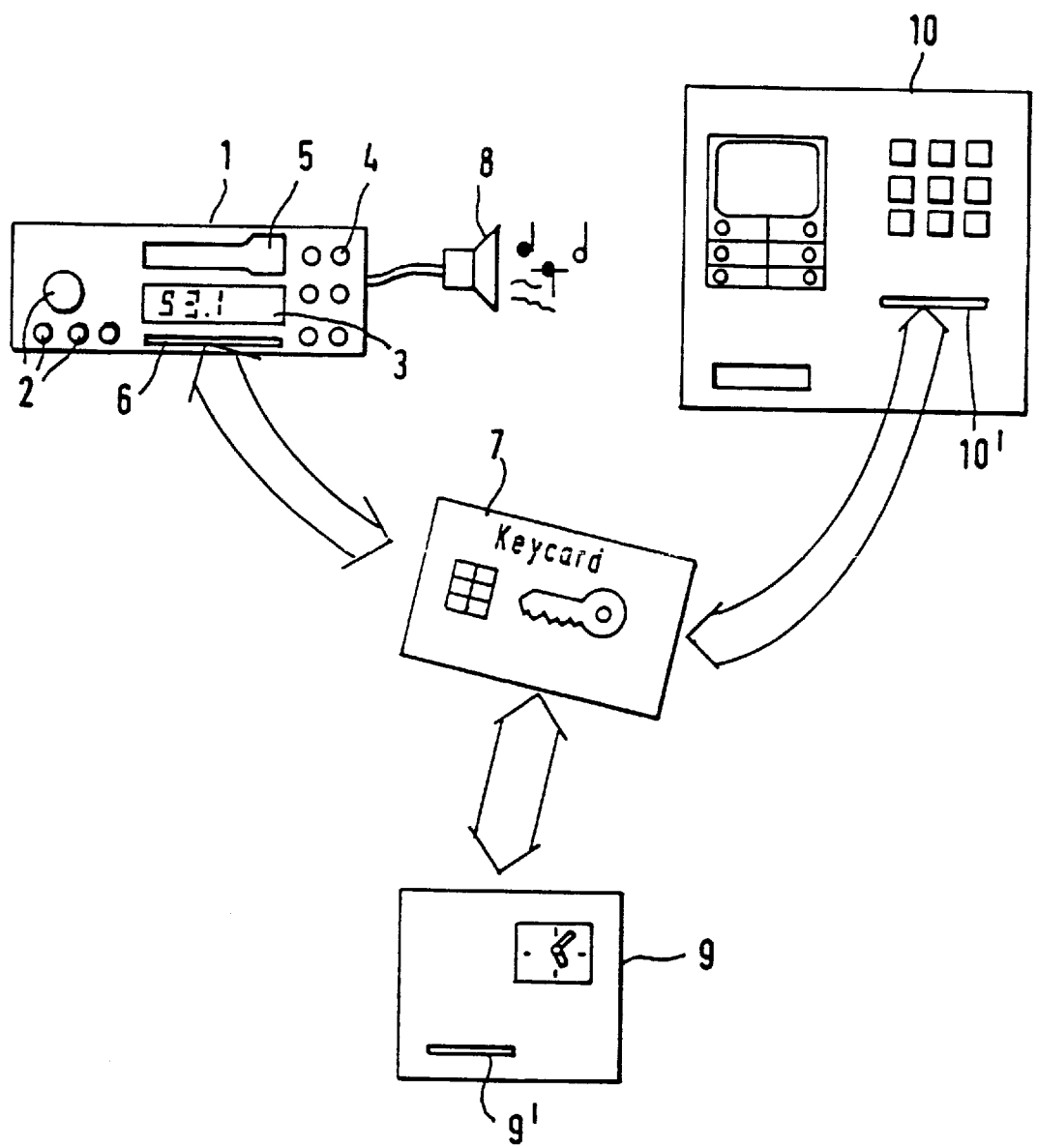
Figure

ELECTRONIC ACCESSORY FOR A MOTOR VEHICLE, IN PARTICULAR FOR A CAR RADIO, COMPRISING A KEY CARD

BACKGROUND INFORMATION

The present invention relates to an electronic add-on device for an automobile, in particular a car radio having a key card designed as a chip card, which can be inserted in an appropriate slot as a prerequisite for being turned on again, in order to safeguard the device from theft.

Electronic add-on devices in the form of car radios, which can only be used if a key card is inserted in the slot of the car radio, have been used for several years. An analog resistor matrix representing a code is integrated on the key card. An equivalent code is stored in a reference memory of the car radio in the form of binary information. As a result, the car radio can only be put into operation with the appropriate key card. The key card must remain in the slot during the entire period of operation. Removal results in the radio being turned off, and it cannot be turned on again without the key card.

The key card designed with an analog resistor matrix has recently been replaced by a chip card having the same functional features.

The function of the known key cards is to make car radios theft-proof by making it impossible to turn them on without the corresponding key card, for example, after theft, so that they become worthless. Since the key card remains in the car radio during the entire period of operation of the latter, there is the danger that the key card may be accidentally left in the car radio after the car is stopped, so that the desired anti-theft function is no longer available. One disadvantage of the security function is also that even the authorized user can no longer make use of the radio in his car if he has misplaced his key card and a second card is not at hand. It should also be considered disadvantageous that, in addition to the many other magnetic strips and chip cards used, another card must be carried and handy in the wallet or handbag.

SUMMARY OF THE INVENTION

An object of the present invention is to eliminate the above disadvantages. This object is achieved by an electronic add-on device for a motor vehicle, in particular a car radio, with a key card designed as a chip card. The add-on device according to the present invention includes a control circuit such that the inserted chip card allows the device to be operated even after the chip card has been removed from the slot and until the device is disconnected from the power supply.

Thus, according to the present invention, the card inserted to allow the electronic add-on device to be operated may be removed during the operation of the electronic add-on device. This design of the electronic add-on device, contrary to the security function considered so far as mandatory, is based on the idea that, in order to provide the anti-theft function, it is only necessary that the electronic add-on device be legally put into operation after installation in the respective vehicle. The ability to turn the device on again after the chip card has been removed is not prejudicial if the power supply to the electronic add-on device has remained uninterrupted. In this case it is ensured that the electronic add-on device remains in its place of installation. A typical car radio theft, on the other hand, results in the electronic add-on device being removed from its place of installation, and thus is necessarily associated with the electronic add-on device being disconnected from the power supply. The electronic add-on device according to the present invention can therefore not be turned on without the authorizing key card once the electronic add-on device has been disconnected from the power supply.

Thus, the design of the electronic add-on device according to the present invention has the advantage that once it has been put into operation, it can always be turned on at the place of installation, i.e., as a rule by the authorized driver, without a key card being required to do so. Yet the anti-theft function is preserved, since the electronic add-on device cannot be put into operation again without a key card after it has been disconnected from the power supply, i.e., in general the on-board power system of the vehicle. Since in the design of the electronic add-on device according to the present invention the key card does not normally remain in the device, it is less likely that the key card would be accidentally left in the device. Thus the anti-theft function is even improved.

For the electronic add-on device according to the present invention, the key card must only be used if the device is to be put into operation again after it has been disconnected from the power supply, for example, after a repair. If, in a preferred embodiment, the chip card is designed so that it can store individual station keys, the key card can also be used if a new assignment of the station keys is to be made effective on the car radio.

Since, according to the present invention, the key card can be removed from the device after the latter has been turned on, a multifunction card, which can be used for other functions such as an ATM card, a debit card, etc., can also be used as a key card for the first time. It is therefore possible to use as the anti-theft key card a chip card that is needed anyway by the owner for using other services and on which only a certain area, which can be programmed by the manufacturer of the electronic add-on device for the key code and possibly other functions, is reserved for the electronic add-on device. Therefore, the user of the electronic add-on device according to the present invention does not always need to keep another card handy for the electronic add-on device alone.

Although the device according to the present invention can be put into operation even without inserting the chip card again, provided the device has not been disconnected from the on-board power system, the chip card can be used each time for turning the device on or off by inserting and removing the chip card. The electronic add-on device can thus be used to store the card, if this can be used for other devices and functions, while the owner is present.

The electronic add-on device usually includes the function of a car radio, but can also include other automobile-specific components interconnected with the car radio into a total system. Such components can be, for example, navigation systems, a chronometer, debit card systems, or the like. Of course, the car radio function can be omitted.

The function of the electronic add-on device will be elucidated below with reference to the enclosed diagrams.

The FIGURE shows an electronic add-on device in the form of a car radio 1, which is equipped as usual with adjustment buttons 2, a display 3, station buttons 4, a music cassette recorder 5 and a slot 6 for a key card 7.

Speakers 8 are connected to the car radio.

In the dual design illustrated, key card 7 can be inserted in the slot 6 of car radio 1, so that the car radio 1 can be turned on for the first time after installation. Then key card 7 can be removed from car radio 1 and used as a multifunction card, for example, to take out cash from an ATM machine 10 or in conjunction with an access control device 9, with each of devices 10, 9 having a slot 10', 9' for key card 7.

Key card 7 can be stored in car radio 1. It can also be used to make station assignments of buttons 4 of car radio 1 effective.

If the car radio has to be disconnected from the on-board power system, for example, for repair purposes, it can be put into operation again by inserting key card 7 in slot 6 of the car radio.

What is claimed is:

1. An electronic add-on device for an automobile, comprising:

a housing having a slot for receiving a key card designed as a chip card, wherein an insertion of the key card into the slot is a prerequisite for an activation of the electronic add-on device; and a control circuit arranged in the housing, wherein:

the electronic add-on device is operable after the key card is removed from the slot until the electronic add-on device is disconnected from a power supply, and the key card is designed as a multifunction card to be operable with at least another device.

2. The electronic add-on device according to claim 1, wherein the electronic add-on device includes a car radio.

3. The electronic add-on device according to claim 2, wherein the key card stores a plurality of individual assignments for a plurality of station buttons of the car radio.

* * * * *